US006135261A

United States Patent [19]

Noell, Jr. et al.

[11] Patent Number: 6,135,261

[45] Date of Patent: Oct. 24, 2000

[54] PAYMENT-RECEIVING ENCLOSURE FOR A VENDING MACHINE

[75] Inventors: Robert E. Noell, Jr., 1232 Adams Ave., Clearwater, Fla. 33756; David A. Norton, 4910 W. Linebaugh Rd., Tampa, Fla. 33624

[73] Assignees: Robert E. Noell, Jr., Clearwater; a part interest; David A. Norton, Tampa, both of Fla.; a part interest

[21] Appl. No.: 09/178,434

[22] Filed: Oct. 23, 1998

[51] Int. Cl.[7] .............................. C07F 9/10; A63F 13/00; A63F 9/00

[52] U.S. Cl. ......................... 194/350; 463/38; 273/148 B

[58] Field of Search .................................... 194/350, 344; 232/15, 16; 463/36, 37, 38, 46, 47; 273/148 B

[56] References Cited

U.S. PATENT DOCUMENTS

| | | | |
|---|---|---|---|
| 3,940,136 | 2/1976 | Runte | 232/15 |
| 4,133,530 | 1/1979 | Takaichi et al. | 463/46 |
| 4,145,978 | 3/1979 | Johnson et al. | 109/59 R |
| 4,440,457 | 4/1984 | Fogelman et al. | 463/46 |
| 4,462,317 | 7/1984 | Franko et al. | 109/45 |
| 4,509,631 | 4/1985 | Kim | 194/350 |
| 4,552,075 | 11/1985 | Glasson et al. | 109/52 |
| 4,840,368 | 6/1989 | Uehara | 271/162 |
| 5,515,959 | 5/1996 | Stephenson, III et al. | 194/206 |
| 5,607,102 | 3/1997 | Walsh et al. | 232/1 D |
| 5,676,231 | 10/1997 | Legras et al. | 194/206 |

*Primary Examiner*—Robert P. Olszewski
*Assistant Examiner*—Bryan Jaketic
*Attorney, Agent, or Firm*—David Kiewit

[57] ABSTRACT

A vertically oriented payment-receiving enclosure and player's console for an arcade game has two juxtaposed check acceptors hinged to it. This allows one of the acceptors to be swung out of the way while the other remains in its normal operating position during servicing and inspection. The arrangement also allows improved maintenance access to an enclosed portion of a player's control mounted in a top portion of the enclosure.

6 Claims, 3 Drawing Sheets

PAYMENT-RECEIVING ENCLOSURE FOR A VENDING MACHINE

CROSS REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

Field of the Invention

This invention pertains to payment-receiving boxes and to cabinet structures for housing a payment-accepting means used with vending machines, arcade games, and other payment-operated apparatus.

Background Information

It is conventional for an arcade game to have a generally horizontally oriented box-like structure extending across its front face. The box-like structure commonly comprises both a player's console (e.g., a joystick and one or more momentary contact button switches disposed on an upper surface of the box-like structure) as well as an enclosure for whatever payment accepting means are used with the game. The payment accepting means, as is known in the art, may comprise a paper currency acceptor, a check acceptor (where the word "check" is employed to embrace both coins and tokens), a credit or debit card acceptor, or various combinations of such acceptors. In arcade games that give the player a chance to obtain one of a number of items on display (e.g., the type of game commonly known as a "crane game" in which the player attempts to use a crane-like mechanism to drop a grasping apparatus onto a selected prize, lift that prize off a pile or other items, carry it to a chute and release it into the chute), the presence of a horizontal box extending across the game partially blocks a passerby's view of the items on display and thereby lessens the appeal of the game. Hence, providing a payment-receiving box and player's console obscuring the view of fewer of the products on display would be a significant improvement.

It is also conventional in the art to provide an arcade game player with a choice as to the type of deposit used to operate a pay-per-play or check-controlled game or vending machine. Thus, one commonly finds arcade games having one bill acceptor and two check acceptors for either coins or tokens. For example, it is conventional in the art to provide two acceptors operated by the same sort of check—either a coin or a token—so as to allow the game to continue to operate even if one of the acceptors is broken, jammed, or otherwise inoperative). The coins or tokens accepted by these machines are commonly retained in a coin receptacle disposed within the same enclosure that holds the coin and/or token acceptors. The volume given over to coin receptacles thus increases the overall size of the payment-receiving box and player's console, and contributes to obscuring a passerby's view of the game.

Prior art acceptor enclosures for arcade games have generally been poorly designed from the viewpoint of maintainability of the enclosed equipment. It is common to find enclosures configured so that check acceptors disposed therein are tilted out of the normal orientation in which they operate when the enclosure is opened. Because check acceptors commonly rely on the force of gravity to move coins or tokens through them, tilting an acceptor from its normal operating orientation renders it inoperable. Thus, in a machine with a conventional enclosure, a repair technician who wishes to service a malfunctioning coin acceptor must completely remove the acceptor from the enclosure and place it in some sort of jig, or other holder, in its normal upright position in order to test the acceptor.

The prior patent art provides several examples of bill acceptors (which conventionally use electric motors to move currency and therefore can operate in a tilted attitude) pivotally mounted within a housing. For example, Legras et al., in U.S. Pat. No. 4,145,978, show a gaming machine having a bill acceptor pivotally mounted to allow loading & unloading of a cash box. Additionally, Uehara, in U.S. Pat. No. 4,840,368, shows a bill acceptor pivotally mounted between two plates so that it swivels out for access.

Player's control means for an arcade game are sometimes mounted on a wall of an enclosure housing the payment-receiving means, although mounting these controls on a separate panel is also well known. Player's control means typically comprise one or more joysticks, one or more discrete momentary contact electrical switches, or a keypad. Some such controls, notably joysticks, are subject to considerable wear and tear during normal operation of a game and hence require frequent maintenance and repair. Although this repair requirement is well known, the conventional practice in arcade game design is to mount a joystick on a console fixedly attached to wall of the game enclosure so that the joystick retaining mechanism and the electrical contacts to the joystick are so located as to require a repair technician to largely disassemble the console or payment-receiving enclosure in order to work on the joystick.

BRIEF SUMMARY OF THE INVENTION

A preferred embodiment of the invention provides a generally vertically oriented combination of a payment-receiving enclosure and a player's console that can be used with an arcade game without seriously obstructing a player's or passerby's view of the interior portion of the game enclosure. In some embodiments, the size of the enclosure is minimized by not having a coin or token receptacle disposed therein. The check receptacle used with this sort of cash box is placed inside the housing of the arcade game itself and communicates with the check acceptor(s) by means of a chute extending through a wall of the game enclosure.

A preferred payment-receiving box and player's console of the invention comprises a pivotally mounted cover portion covering one or more check acceptors when closed, the cover portion not moving the check acceptor or acceptors out of a normal and upright operating position when opened. In a particular preferred embodiment, which employs two juxtaposed check acceptors, each of the acceptors is separately pivotable with respect to a fixed portion of the payment-receiving box so that a repair technician desiring to check the function of one of the acceptors can open the cover and pivot the other acceptor out of the way, thereby assuring the technician unrestricted visual access to both sides of the acceptor being tested.

A preferred embodiment of the payment-receiving box and player's console further comprises a cover portion having a player's control, such as a joystick, fixedly mounted in a throughhole extending through the cover portion and arranged so that the portion of the user control inside the cover portion is exposed to view when the cover is open. In a preferred embodiment, the portion of the control that is inside the box is spaced apart from a sidewall of the box by at least a hand's-breadth when the cover is opened. Moreover, the maximum vertical extent of the cover is preferably selected to be as short as is commensurate with its function in order to minimize the cover's protrusion into an aisle or other space in front of the game when the cover is pivoted away from the body of the enclosure during a service operation.

Additionally, a preferred enclosure comprises a body portion fixedly attached to a payment-operated apparatus and a cover portion hingedly attached thereto, the body portion and cover portion fitted together in a tongue-and-groove arrangement extending along much of the rim of the cover and along a corresponding portion of the body portion when the enclosure is closed.

DETAILED DESCRIPTION OF THE INVENTION

Figure 1:
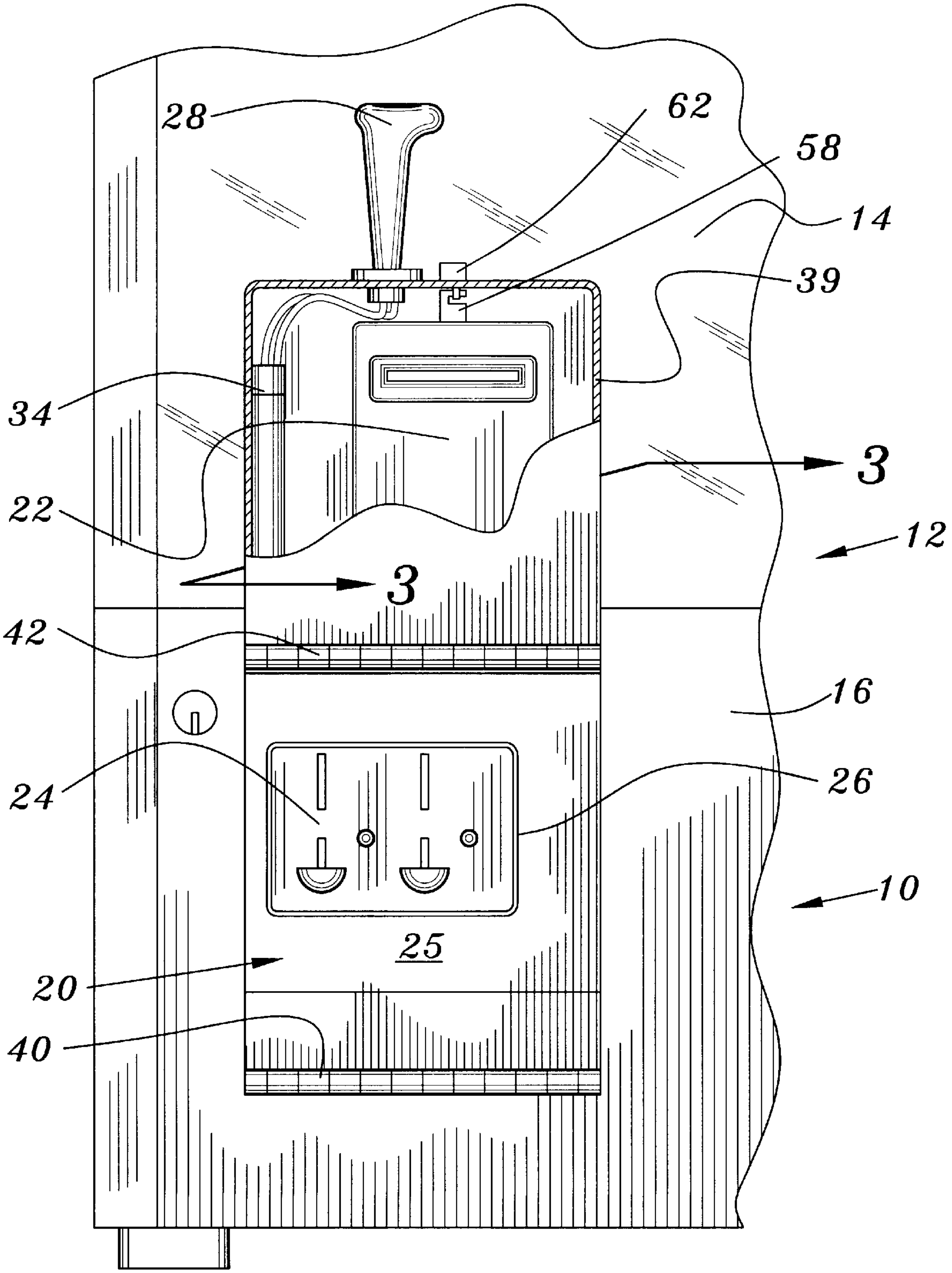
FIG. 1 is a front elevational view of a payment-receiving box of the invention mounted on the front of a vending machine.

An arcade game or other payment-operated apparatus 10 may comprise a housing 12 having a transparent portion 14 through which a passerby can see available items displayed within the housing, and an opaque base portion 16. A generally vertically oriented payment-receiving box 20, which may be substantially taller than it is wide, is fixedly attached to a surface of the game housing 12. In a preferred embodiment the payment-receiving box 20 holds a currency acceptor 22 and two or more metallic check acceptors 24 arranged so that a player can insert money or tokens into an appropriate acceptor 22, 24 when he or she wishes to play the arcade game. As is common in the vending art, the box 20 provides one or more cut-outs or windows 26 in its front surface 25 for mounting the acceptors so that the player has access only to those portions used for accepting and returning payment.

Figure 3:
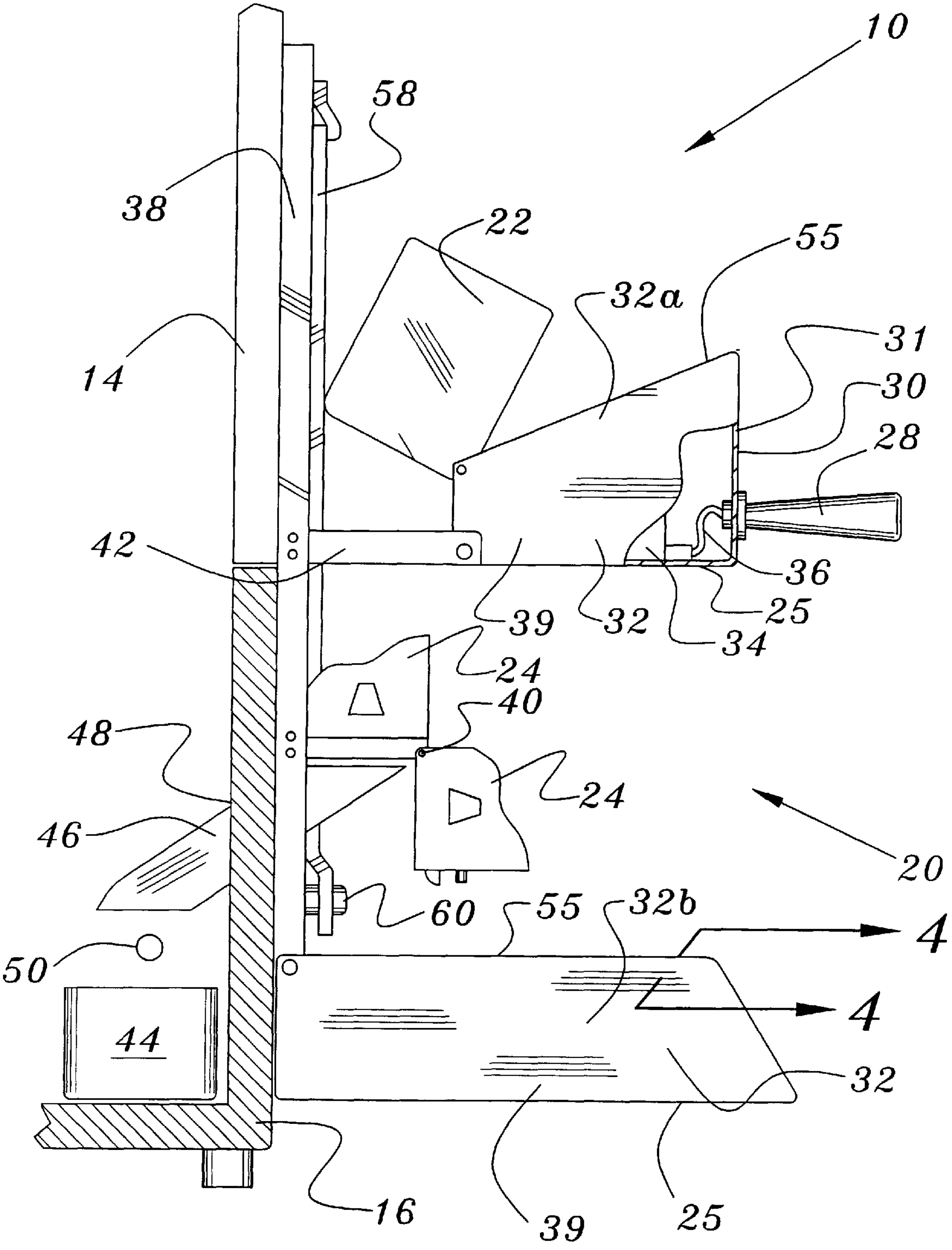
FIG. 3 is a sectional view taken as indicated by the line 3—3 in FIG. 1, the view showing a side elevation of the payment-receiving box with both covers thereof pivoted into their respective open positions.

In a preferred embodiment the payment-receiving box 20 also functions as a player's console and has one or more manually actuated control elements (e.g., a joystick 28) mounted in a throughhole at the top 30 of the closed payment-receiving box 20 (i.e., in an end-wall 31 portion of a pivotally mounted cover portion 32 thereof). As depicted in FIG. 3, when the cover portion 32 is pivoted into its open position, the joystick 28 and any other control elements associated with the player's console are spaced apart from the end 31 and side walls 39 of the box by a substantial fraction of a hand's-breadth and are therefore accessible for service or replacement. A printed circuit board 34, or other portion of a control which is commonly connected to the manually actuated control element by flexible wiring 36 may be conveniently attached to the cover portion 32 (e.g., as depicted in the drawing), or may be located elsewhere within the payment-receiving box 20 or within the game's housing 12.

A preferred embodiment of the payment-receiving box 20 has two covers 32, an upper one 32*a* of which covers a currency acceptor 22 and the lower of which 32*b* covers a pair of juxtaposed check acceptors 24. Both of the cover portions 32*a*, 32*b* are hingedly attached to a back portion 38 adapted to be fixedly attached to the game housing 12 (e.g., by a plurality of bolts extending through respective aligned holes in the back portion 38 of the payment-receiving box 20 and a wall 16 of the housing 12 so that one of the two ends of each of the bolts is within the locked housing 12 and the other end is securely retained within the payment-receiving box 20 when the cover 32 is locked). Although one could configure a payment-receiving box 20 having a single cover, such an arrangement is not particularly desirable in boxes that are substantially taller than they are wide. When the box is opened for service, the hinged cover, or covers, extend outwardly from the front of the vending machine or game 10 and, if overly long, may create a trip hazard to anyone who might walk by the machine 10 while it is being serviced.

A bill acceptor 22 is preferably disposed within an upper portion of the payment-receiving box 20 and may be hingedly attached thereto. In this position the acceptor can be pivoted back and forth so as to facilitate loading and unloading of its currency magazines. In ordinary usage, the bill acceptor 22, from which an operator must regularly remove accepted currency, is accessed much more frequently than is a check acceptor 24, particularly if the check acceptor is configured to deliver accepted coins or tokens through a chute 46 into an interior portion of the game 10. Moreover, putting the bill acceptor 22 in the higher position is believed to encourage insertion of paper currency.

A preferred payment-receiving box 20 comprises a pair of coin acceptors 24 disposed within a lower portion of the box. Each of the coin acceptors 24 is attached by hinge means 40 to a ledge-like fixed support member 42 that is either fixedly attached to or integrally formed with the back portion 38 of the box 20. The hinge 40 permits a repair technician to selectively pivot one of the two acceptors 24 out of the way so that both sides of the other of the coin acceptors 24 can be visually and manually accessed. Because repairing a coin acceptor often requires inspecting the operation of the acceptor by observing a coin moving through the acceptor, and because that coin is impelled through the acceptor by the force of gravity, it is important that the sides of the acceptor be visible when the acceptor is disposed in its normal operating position. Many prior art coin operated machines have a coin acceptor mounted in such a way that visual access is denied by adjacent portions of the machine. Other prior art machines have coin acceptors affixed to a cover portion of the machine so that when the cover is opened, the attached acceptor is not retained in its normal operating position. Servicing an acceptor in these prior art machines commonly involves removing the acceptor from the machine and mounting it in a jig on a workbench, or other suitable surface. This arrangement is highly inconvenient if an acceptor requires service on the crowded floor of an operating arcade.

In some embodiments, it is desirable to minimize the volume of the payment-receiving box 20 in order to better fit it to a selected vending apparatus. One arrangement that serves this goal comprises placing the receptacle(s) 44 for coins or tokens within the housing 12 of an arcade game 10 and external to the payment-receiving box 20. A coin chute 46, installed through aligned throughholes 48 in the housing 12 and in the back portion 38 of the box 20, provides a means of moving a coin 50 from one of the acceptors 24 to the receptacle. This arrangement, depicted in FIG. 3, not only aids in minimizing the volume of the apparatus, but also contributes to operational convenience in that the coin receptacle 44 can be accessed at the same time that the vending apparatus 10 is restocked without requiring the operator to open the cover 32*b* covering the coin acceptors 24. Because the cover 32*b* is normally opened only when one of the check acceptors 24 requires service, a retainer pin, or other separate closure means, is used to prevent the cover 32*b* from falling open when an operator unlocks the box 20 and opens the cover 32*a* over the bill acceptor 22.

Figure 2:
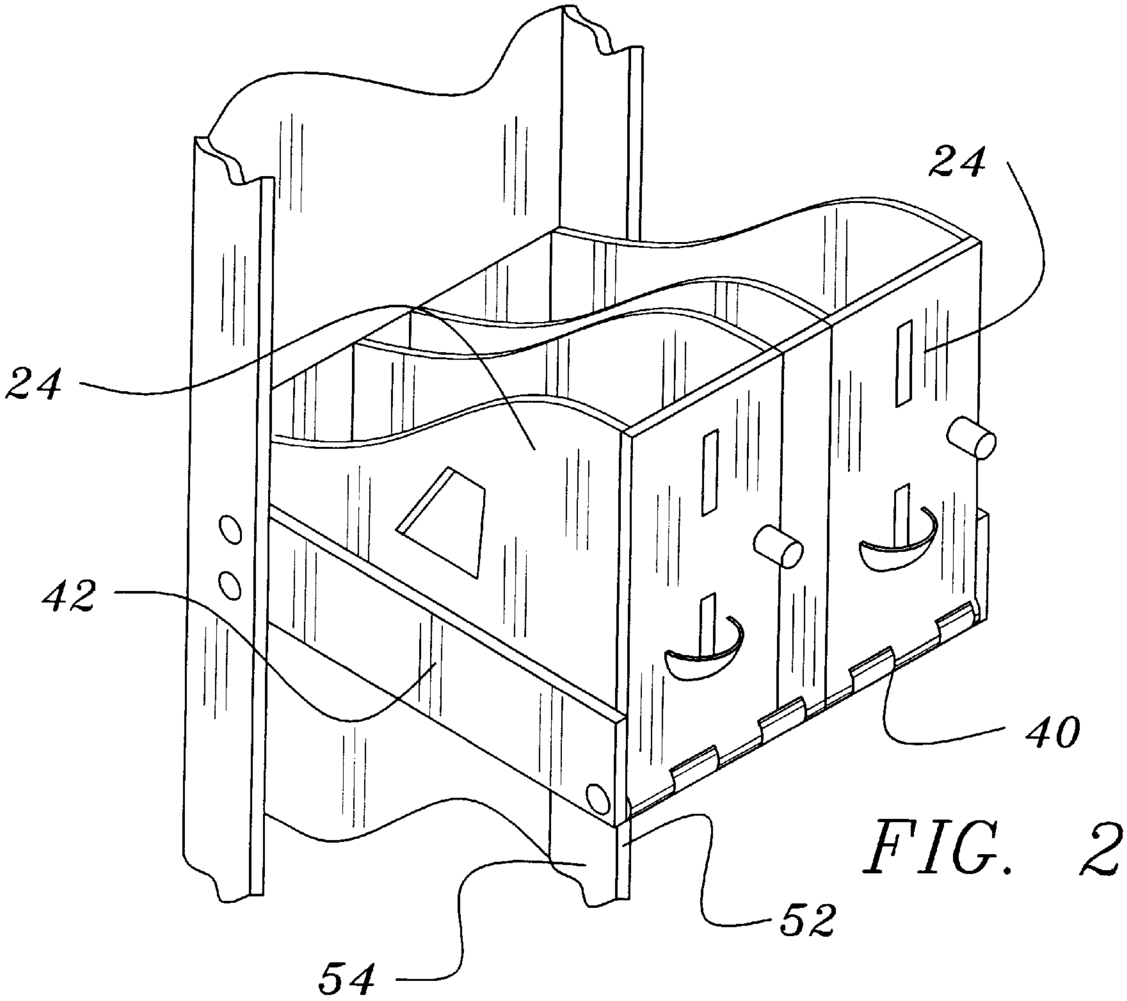
FIG. 2 is a partial elevational view of two coin acceptors disposed in a payment-receiving box, the view taken with the cover of the payment-receiving box opened.
Figure 4:
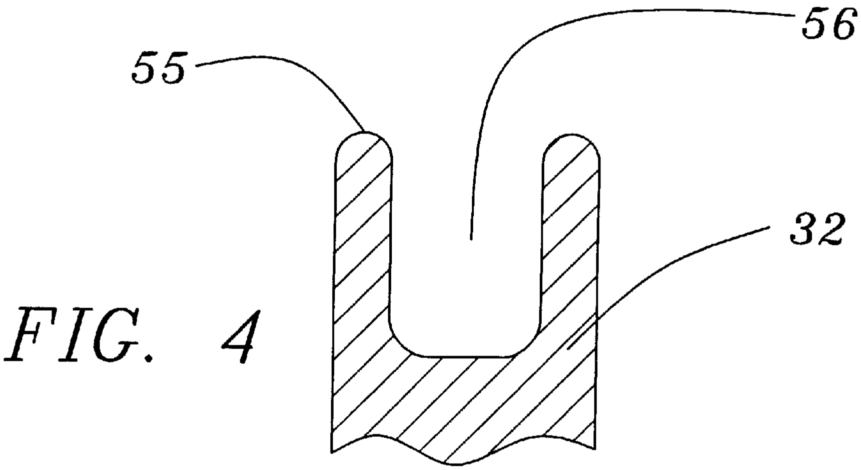
FIG. 4 is a cross-sectional view through a cover portion, as indicated by the line 4—4 in FIG. 3, showing a preferred grooved configuration of the walls of the cover.

In order to make the payment-receiving box 20 resistant to a would-be thief's attack with a pry bar or other like instrument, it is preferred to provide tongue-and-groove mating between the cover 32 and back portion 38 of the box 20. As depicted in FIG. 2, a suitable tongue 52 may be provided along a portion of the periphery of the back portion 38 by the use of side-members 54 having a well-known ell-shaped cross-section. A corresponding portion of the rim 55 of the cover portion 32 can then be provided with a mating groove 56 cut into its edge, as depicted in FIG. 4. It will be recognized that one could alternately provide a back portion that was slotted or grooved about a significant fraction of its periphery and use that back portion in conjunction with a cover portion having an upstanding, tongue-like edge adapted to fit into the groove on the back portion.

A preferred embodiment uses a single locking bar 58, pivotally mounted to a pin 60 near the bottom of the payment-receiving box 20, and retained in a locked position by a known high-security lock 62 mounted in the top surface 30 of the box 20. When the lock 62 is unlocked, the bar pivots towards one side of the box and releases the top cover 32*a*. As noted hereinbefore, it is inconvenient to have both covers 32*a*, 32*b* fall open simultaneously. Hence, a separate retaining pin (not shown), accessible from inside the upper portion of the unlocked and opened box 20, may be used to hold the lower cover 32*b* closed.

Although the present invention has been described with respect to several preferred embodiments, many modifications and alterations can be made without departing from the invention. Accordingly, it is intended that all such modifications and alterations be considered as within the spirit and scope of the invention as defined in the attached claims.

What is claimed is:

1. In a payment-receiving box for a payment-operated apparatus, the payment-receiving box comprising a first portion adapted to be fixedly attached to a wall of the payment-operated apparatus, the payment-receiving box having a plurality of check acceptors disposed therein, each of the check acceptors having a normal operating orientation, an improvement comprising:

a cover attached to the first portion by means of a first hinge, the cover adapted to move between a closed state in which an end of the cover distal from the first hinge abuts the first portion and an open state in which the end distal from the first hinge is displaced therefrom; and at least one additional hinge attaching two of the check acceptors to the first portion in a juxtaposed arrangement, the one at least one additional hinge adapted to allow one of the two acceptors to remain in the normal operating orientation when the second of the two acceptors is pivoted away from the normal operating orientation.

2. The payment-receiving box of claim 1 wherein a portion of the cover comprises a rim, and wherein the rim is adapted to fit together with a peripheral portion of the first portion in a tongue-and-groove arrangement when the cover is in the closed state.

3. In a payment-receiving box for a payment-operated apparatus, the payment-receiving box comprising a first portion adapted to be fixedly attached to a wall of the payment-operated apparatus, the payment-receiving box having a plurality of check acceptors disposed therein, each of the check acceptors having a normal operating orientation, an improvement comprising:

a cover attached to the first portion by means of a first hinge, the cover adapted to move between a closed state in which an end of the cover distal from the first hinge abuts the first portion and an open state in which the end distal from the first hinge is displaced therefrom, the end of the cover distal from the first hinge having a throughhole therethrough the throughhole adapted to have a player's control inserted therethrough, whereby a portion of the player's control is enclosed within the box when the box is in the closed state and the enclosed portion of the player's control is spaced apart from a side wall of the box by substantially a hand's breadth; and at least one additional hinge adapted to attach two of the check acceptors to the first portion in a juxtaposed arrangement, the at least one or more hinge further adapted to allow one of the two acceptors to remain in the normal operating orientation when the second of the two acceptors is pivoted away from the normal operating orientation.

4. A method of inspecting the operation of a first check acceptor, the first check acceptor juxtaposed with a second check acceptor in a payment-receiving enclosure having an open state and a closed state, the first and the second check acceptors attached to the enclosure by a hinge, the first check acceptor having a normal operating orientation in which a check inserted thereinto passes therethrough under the influence of gravity, the method comprising the steps of:

a) placing the payment-receiving enclosure in the open state;

b) pivoting the second check acceptor about the hinge while leaving the first check acceptor in the normal operating orientation; and c) inserting a check into the first check acceptor.

5. A player's console for a payment-operated game having a payment-receiving box attached to an enclosure of the game, the console comprising an end portion of a cover of the box and a player's control means, the control means disposed in a throughhole in the end portion so that a first portion of the control means is disposed within the box when the box is in a closed state, the control means spaced apart from a sidewall of the box by substantially a hand's breadth, the cover hingedly attached to the enclosure, whereby the cover is adapted to be moved between the closed state in which the end portion is adjacent the enclosure and an open state in which the end portion is distal from the enclosure.

6. The player's console of claim 5 further comprising pivotal attachment means adapted to attach two check acceptors to the box in a juxtaposed arrangement, the pivotal attachment means adapted to allow one of the two acceptors to remain in a normal operating orientation when the second of the two acceptors is pivoted away from the normal operating orientation.

* * * * *